US011209378B2

(12) United States Patent
Artmann et al.

(10) Patent No.: US 11,209,378 B2
(45) Date of Patent: Dec. 28, 2021

(54) CELLDRUM ELECTRODE ARRANGEMENT FOR MEASURING MECHANICAL STRESS

(71) Applicant: FACHHOCHSCHULE AACHEN, Aachen (DE)

(72) Inventors: Gerhard Artmann, Aachen (DE); Peter Linder, Julich (DE); Robin Bayer, Julich (DE); Matthias Gossmann, Julich (DE)

(73) Assignee: FACHHOCHSCHULE AACHEN, Aachen (DE)

( * ) Notice: Subject to any disclaimer, the term of this patent is extended or adjusted under 35 U.S.C. 154(b) by 177 days.

(21) Appl. No.: 16/069,450

(22) PCT Filed: Jan. 16, 2017

(86) PCT No.: PCT/EP2017/050749
§ 371 (c)(1),
(2) Date: Jul. 11, 2018

(87) PCT Pub. No.: WO2017/121890
PCT Pub. Date: Jul. 20, 2017

(65) Prior Publication Data
US 2019/0033245 A1 Jan. 31, 2019

(30) Foreign Application Priority Data
Jan. 15, 2016 (LU) .......................... 92948

(51) Int. Cl.
G01N 27/22 (2006.01)
(52) U.S. Cl.
CPC ......... G01N 27/227 (2013.01); G01N 27/226 (2013.01)
(58) Field of Classification Search
CPC .................. G01N 27/226; G01N 27/227
See application file for complete search history.

(56) References Cited

U.S. PATENT DOCUMENTS 6,681,637 B2* 1/2004 Jacob .................... G01L 9/0075
73/700
7,086,288 B2* 8/2006 Lee .................. G01N 33/54373
73/718

(Continued)

FOREIGN PATENT DOCUMENTS

EP    2218772        8/2010
WO   WO 02/18937    3/2002

OTHER PUBLICATIONS

Green et al. "An integrated instrument for rapidly deforming living cells using rapid pressure pulses and simultaneously monitoring applied strain in near real time," Review of Scientific Instruments, Dec. 2010, vol. 81, No. 12, 125102, 6 pages.

(Continued)

Primary Examiner — Justin N Olamit
(74) Attorney, Agent, or Firm — Sheridan Ross P.C.

(57) ABSTRACT

The invention pertains to a CellDrum electrode arrangement for measuring mechanical stress, comprising a mechanical holder (1) and a non-conductive membrane (4), whereby the membrane (4) is at least partially fixed at its circumference to the mechanical holder (1), keeping it in place when the membrane (4) may bend due to forces acting on the membrane (4), the mechanical holder (1) and the membrane (4) forming a container, whereby the membrane (1) within the container comprises an cell-membrane compound layer or biological material (3) adhered to the deformable membrane 4 which in response to stimulation by an agent may exert mechanical stress to the membrane (4) such that the membrane bending stage changes whereby the container may be filled with an electrolyte, whereby an electric contact (2) is arranged allowing to contact said electrolyte when filled into to the container, whereby within a predefined geometry to the fixing of the membrane (4) an electrode (7) is arranged, whereby the electrode (7) is electrically insulated with (Continued)

respect to the electric contact (2) as well as said electrolyte, whereby mechanical stress due to an agent may be measured as a change in capacitance.

6 Claims, 3 Drawing Sheets

(56) References Cited

U.S. PATENT DOCUMENTS

| | | | |
|---|---|---|---|
| 7,088,567 B2* | 8/2006 | Hunt | H01G 5/0132 361/277 |
| 2012/0293189 A1 | 11/2012 | Qureshi et al. | |
| 2014/0065657 A1* | 3/2014 | Dekker | C12N 5/0657 435/29 |

OTHER PUBLICATIONS

Park et al. "Real-time measurement of the contractile forces of self-organized cardiomyocytes on hybrid biopolymer microcantilevers," Analytical Chemistry, Oct. 2005, vol. 77, No. 20, pp. 6571-6580.

Search Report and Written Opinion for Luxembourg Patent Application No. 92948, dated Dec. 21, 2016, 11 pages.

International Search Report and Written Opinion prepared by the European Patent Office dated Apr. 10, 2017, for International Application No. PCT/EP2017/050749.

* cited by examiner

Graph 3: Signal characteristics relating to SBAY K 8644 concentration

CELLDRUM ELECTRODE ARRANGEMENT FOR MEASURING MECHANICAL STRESS

CROSS REFERENCE TO RELATED APPLICATIONS

This application is a national stage application under 35 U.S.C. 371 and claims the benefit of PCT Application No. PCT/EP2017/050749 having an international filing date of 16 Jan. 2017, which designated the United States, which PCT application claimed the benefit of Luxembourg Patent Application No. 92948 filed 15 Jan. 2016, the entire disclosures of each of which are incorporated herein by reference.

The invention pertains to a CellDrum electrode arrangement for measuring mechanical stress.

BACKGROUND

Within pharmacy it is a necessity to test substances for their effects. Testing may be done in several ways including the application of substances towards animals.

It is to be noted that certain diseases like hypertonia and cardiovascular diseases are top risks in Germany which is expected to increase in number of cases by more than 100% as well within the next 30 years.

Testing itself is extremely expensive.

In the past new approaches have been developed allowing for reducing the amount of animals used for testing.

Such an approach is for example known from WO 2002018937 A1. There a so called CellDrum is used. The CellDrum is a membrane covered by biological layer. When the biological layer is subjected to certain agents to be tested cells of the biological layer are stressed thereby exerting forces to the membrane which thereby is induced to deform/bend. The deformation/bending of the membrane itself is measured by means of laser.

Other methods known in the art describe cell sheet wrinkling where a rather inflexible membrane is wrinkled by forces exerted when being subjected to an agent.

In addition methods are known which measure a tensile strength of single cells.

However, for meaningful testing in pharmacy/toxicology it is often necessary to perform numerous measurements in parallel in order to be able to process acceptable amounts of probes.

So far only the method based on laser technology outlined above allows for precise measurements of forces exerted by cells on the membrane.

The costs involved with these laser measurement systems are extremely high so that parallel measurements may not be envisaged. However a sequential measurement of a plurality of cells is also not feasible as the precise measurements may only be performed due to a precise alignment which is time consuming.

Also some of the above technologies do only allow for measurements of deformations and some of the above technologies are error prone in that peripheral conditions may highly influence the measurements.

I.e. the known technologies may allow for a certain property, such as precision, reproducibility, sensitivity, speed, costs, to be achieved at the cost of at least another property.

Starting from this situation it is an object of the invention to provide a new system for testing which allows for quicker and non-expensive test results.

SHORT DESCRIPTION OF THE INVENTION

The object is solved by a CellDrum electrode arrangement for measuring mechanical stress. The CellDrum electrode arrangement comprises a mechanical holder and a non-conductive membrane. The membrane is at least partially fixed at its circumference to the mechanical holder, keeping the membrane in place when the membrane may bend and/or stretch due to forces acting on the membrane.

The mechanical holder and the membrane are forming a container, whereby the membrane within the container comprises a cell-membrane compound layer of biological material adhered to the deformable membrane which in response to stimulation by an agent may exert mechanical stress to the membrane such that the membrane bending stage changes.

The container may be filled with an electrolyte, whereby an electric contact is arranged allowing to contact said electrolyte when filled into to the container, whereby within a predefined geometry to the fixing of the membrane an electrode is arranged, whereby the electrode is electrically insulated with respect to the electric contact as well as said electrolyte, whereby mechanical stress due to an agent may be measured as a change in capacitance.

Further advantageous embodiments are subject to the dependent claims.

BRIEF DESCRIPTION OF THE DRAWINGS

In the following reference will be made towards the figures. In these

DETAILED DESCRIPTION

Figure 1:
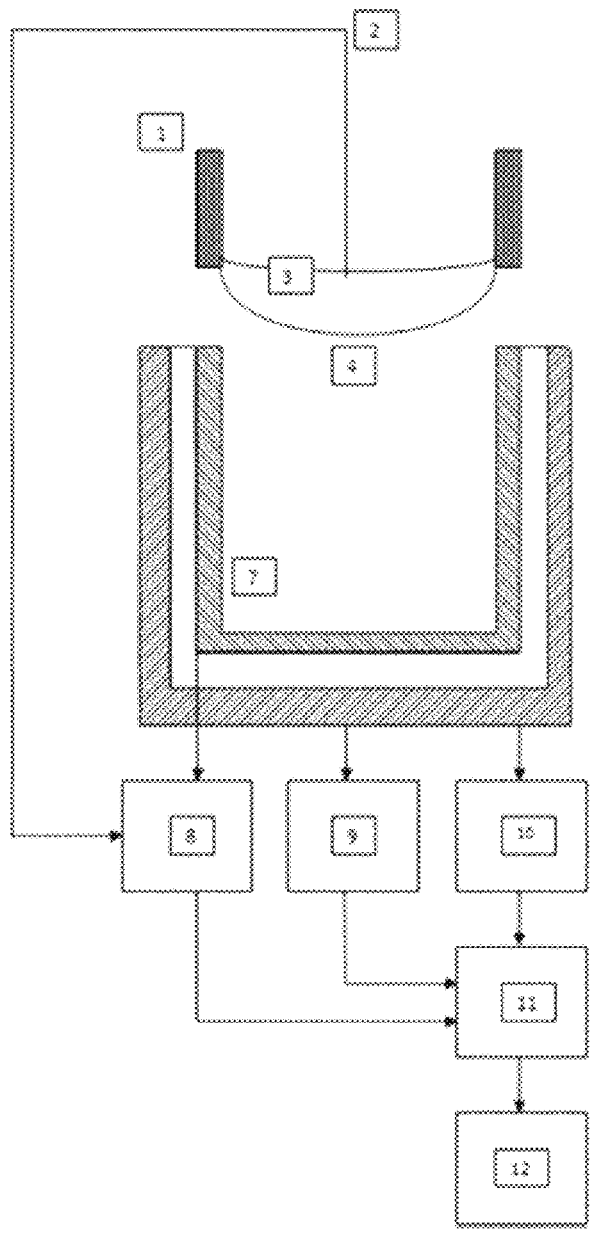
FIG. 1 shows a setup of embodiments of a cell drum electrode according to the invention.

The present disclosure describes preferred embodiments with reference to the Figures, in which like reference signs represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention.

I.e., unless indicated as alternative only any feature of an embodiment may also be utilized in another embodiment.

In addition, even though at some occurrences certain features will be described with reference to a single entity, such a description is for illustrative purpose only and actual implantations of the invention may also comprise one or more of these entities. I.e. usage of singular also encompasses plural entities unless indicated.

An exemplary embodiment will now be described with reference to the figure.

There a CellDrum electrode arrangement for measuring mechanical stress is shown schematically. The CellDrum electrode arrangement comprises inter alia a mechanical holder 1 and a non-conductive membrane 4.

The membrane 4 is at least partially fixed at its circumference to the mechanical holder 1, keeping the membrane 4 in place when the membrane 4 may bend due to forces acting on the membrane 4.

The mechanical holder 1 and the membrane 4 are forming a container. The container may be filled with a liquid comprising an agent to be tested.

The membrane 1 within the container comprises an cell-membrane compound layer of biological material 3 adhered to the deformable membrane 4 which in response to stimulation by an agent may exert mechanical stress to the membrane 4 such that the membrane bending stage changes. I.e. the membrane may already be bend before additional stress is exerted by the cell-membrane compound layer of biological material 3. As such a change in bending state can be measured which is evoked by the agent when being applied to the cell-membrane compound layer of biological material 3 adhered to the deformable membrane 4.

The container formed by the mechanical holder 1 and the membrane 4 may be filled with an electrolyte.

An electric contact 2 is arranged allowing for contacting said electrolyte when filled into to the container, whereby within a predefined geometry to the fixing of the membrane 4 an electrode 7 is arranged, whereby the electrode 7 is electrically insulated with respect to the electric contact 2 as well as said electrolyte, whereby mechanical stress due to an agent may be measured as a change in capacitance.

I.e. the membrane 4 and the electrode 7 are forming plates of a capacitor. The capacitance of this capacitor is defined inter alia by the size of the plates and their distance to one another and the electric susceptibility of the medium in between the plates. As the membrane as of the plates may bend the capacitance of the capacitor will change immediately. Hence, the direct or indirect measurement of the capacitance allows for an immediate response. This may also be understood as an electric field measurement.

In an embodiment of the invention the capacitor may be arranged together with inductivity 8 thereby forming a tunable oscillation circuit. I.e. A change in capacitance may be measured as a frequency shift, e.g. by a microcontroller 11. It is to be noted that the term microcontroller is not limiting and similar arrangements such as microprocessors being equipped with respective memory and/or Field-Programmable-Gate-Arrays (FPGA), System-On-Chip (SOC) or the like may be used instead.

In a further embodiment of the invention the space in between the membrane 4 and the electrode 7 may be filled with a predetermined amount of a conductive fluid. By means of conductive fluids one may adapt the overall distance of the plates of the capacitor. Hence, in cases where the overall bending due to cell forces is rather small the sensitivity may be increased respectively the capacitance may be tuned by minimizing the overall distance.

In a further embodiment of the invention the temperature of the electrolyte and/or interior of the container may be adapted. By tuning the temperature one may induce or inhibit certain agents as well as accelerate or decelerate interaction of an agent with the cell-membrane compound layer of biological material 3 adhered to the deformable membrane 4.

In a further embodiment of the invention the pressure on the electrolyte and/or interior of the container may be adapted. By tuning the pressure one may induce or inhibit certain agents as well as accelerate or decelerate interaction of an agent with the cell-membrane compound layer of biological material 3 adhered to the deformable membrane 4. Also it is possible to sanitize the arrangement. Therefore, it may be foreseen to provide a pump 9 and a pressure sensor 10 both connectable towards a microcontroller 11 as outlined above.

In a further embodiment of the invention the gaseous composition of the interior of the container may be adapted. By adapting the gaseous composition one may induce or inhibit certain agents as well as accelerate or decelerate interaction of an agent with the cell-membrane compound layer of biological material 3 adhered to the deformable membrane 4. Also it is possible to sanitize the arrangement. Therefore, it may be foreseen to provide a pump 9 and a pressure sensor 10 both connectable towards a microcontroller 11 as outlined above.

In a further embodiment of the invention the membrane will be additionally bended by an external pressure acting against the cellular bending forces on the membrane, which may simulate high "blood pressure" situations.

In a further embodiment of the invention the membrane bending can be measured fast enough as a function of time to allow time constant measurements of drug actions etc.

Figure 2:
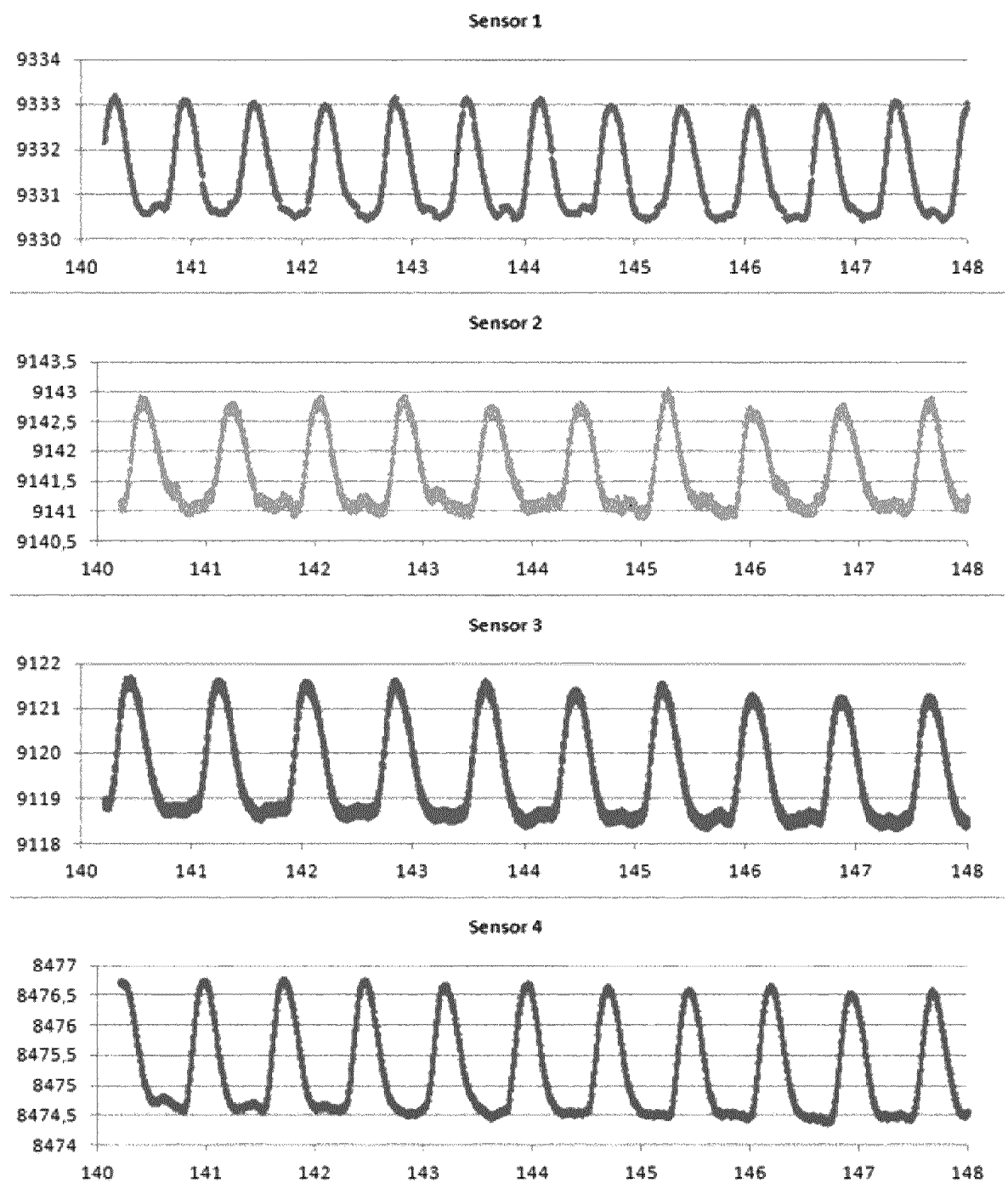
FIG. 2 shows measurements made with cell drum electrode according to the invention.

E.g. in FIG. 2 the beat amplitudes of cardiomyocytes within 4 different celldrum electrode arrangements according to the invention are shown. There the ordinate denoted in Hz is a measure of the displacement/bending of the membrane 4 whereas the abscissa denoted in s is the respective time lapsed.

Figure 3:
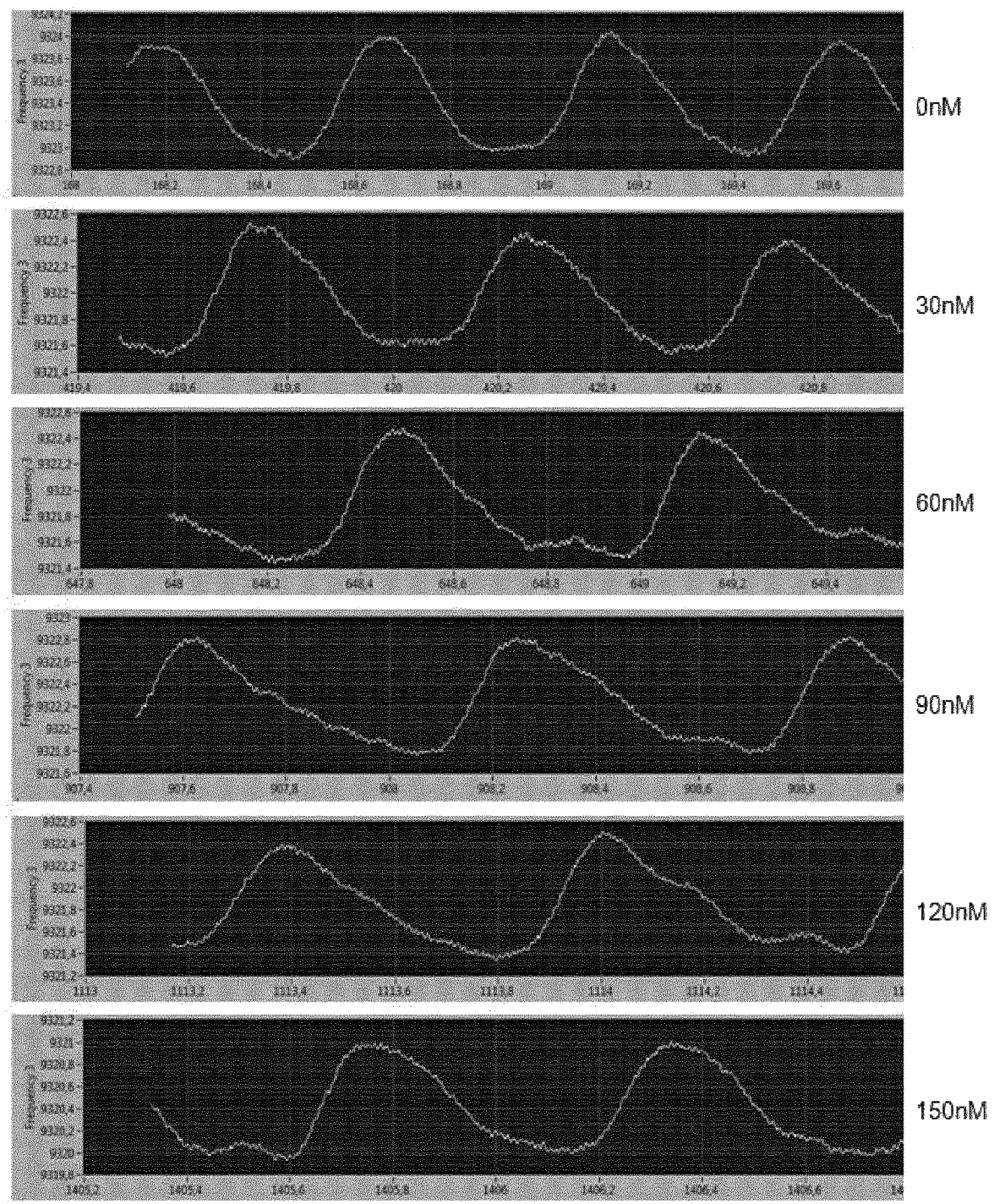
FIG. 3 shows further measurements made with cell drum electrode according to the invention.

In FIG. 3 the beat amplitudes of cardiomyocytes monolayers celldrum electrode arrangements according to the invention are shown. There different probes where treated with substance SBay k8466 with increasing concentration. The respective concentration is shown right hand of the signals. Again the ordinate denoted in Hz is a measure of the displacement/bending of the membrane 4 whereas the abscissa denoted in s is the respective time lapsed.

The cell-membrane compound layer of biological material 3 adhered to the deformable membrane 4 may comprise cardiomyocytes and in particular cardiomyocytes monolayers. Cardiornyocytes may originate from stem cells.

The arrangement of the invention allows for a direct measurement of the contraction forces of the cardiomyocytes. Therefore, the arrangement is of particular value when testing new substances making extremely costly measurement arrangements such as langendorff perfused hearts.

Cell forces are mechanical forces, originating from cells and transferred to other cells (intercellular) or substrates such as the membrane 4 directly or via secreted cellular matrices.

The membrane 4, respectively the surface thereof in contact with the cells, may be natural or artificial. The membrane 4 as well as the cell-membrane compound layer of biological material 3 adhered to the deformable membrane 4 may be rather thin compared to the overall size in between the mechanical holder 1.

By means of the invention even small lateral tensile forces exerted by cell-membrane compound layer of biological material 3 to the membrane 4 may be measured over time. The forces act via the fixation at its circumference to a holder 1 and thereby bend the membrane 4. The cell-membrane compound layer or biological material layer 3 is accessible during the measurement. Therefore, one may easily apply agent such as chemical compounds or pharmacological substances and one may also vary surrounding conditions.

As the arrangement is rather inexpensive, one may easily provide multiple arrangements in parallel allowing for parallel measurements of substances in varying concentrations and under varying conditions.

The arrangement may be controlled by a microcontroller 11 and may also provide data 12 via direct or indirect measurements of the bending changes of the membrane 4.

Hence, the system may also be fully automated. Furthermore, the arrangement may also be kept in $CO_2$ atmosphere and at any kind of ambient temperature.

Since the arrangement allows for small devices also the amount of an substance to be tested may be kept at a minimal level. This is of particular value as many substances when being tested are extremely expensive.

What is claimed is:

1. A CellDrum electrode arrangement for measuring mechanical stress, comprising:
    a mechanical holder;
    a non-conductive membrane, whereby the membrane is at least partially fixed at a circumference of the membrane to the mechanical holder, keeping the membrane in place even when the membrane bends and/or stretches due to forces acting on the membrane, the mechanical holder and the membrane forming a container; and
    a controller,
    wherein the membrane within the container comprises a cell-membrane compound layer of biological material adhered to the membrane which, in response to stimulation by an agent, exerts mechanical stress to the membrane such that a membrane bending stage changes,
    wherein the container is filled with an electrolyte,
    wherein an electric contact is arranged to contact said electrolyte and to not contact the membrane when the electrolyte is filled into the container,
    wherein within a predefined geometry to the fixing of the membrane an electrode is arranged, whereby the electrode is electrically insulated with respect to the electric contact as well as said electrolyte, and
    wherein the controller measures a change in capacitance between the membrane and the electrode due to the mechanical stress.

2. The CellDrum electrode arrangement according to claim 1, wherein the change in capacitance is measured as a frequency shift by the controller.

3. The CellDrum electrode arrangement according to claim 1, wherein a space in between the membrane and the electrode is filled with a predetermined amount of a conductive fluid.

4. The electrode arrangement according to claim 1, wherein a temperature of the electrolyte and/or interior of the container accelerates or decelerates interaction of the agent with the membrane.

5. The CellDrum electrode according to claim 1, wherein the membrane is additionally bended by an external pressure acting against cellular bending forces on the membrane.

6. The CellDrum electrode arrangement according to claim 1, wherein the membrane bending is measurable as a function of time by the controller to allow time constant measurements of drug actions.

* * * * *